(12) United States Patent
Kroker et al.

(10) Patent No.: US 10,352,810 B2
(45) Date of Patent: Jul. 16, 2019

(54) PRESSURE SENSOR

(71) Applicant: Robert Bosch GmbH, Stuttgart (DE)

(72) Inventors: Andreas Markus Kroker, Neu-Ulm (DE); Christian Solf, Rheinstetten (DE)

(73) Assignee: Robert Bosch GmbH, Stuttgart (DE)

( * ) Notice: Subject to any disclaimer, the term of this patent is extended or adjusted under 35 U.S.C. 154(b) by 112 days.

(21) Appl. No.: 15/623,147

(22) Filed: Jun. 14, 2017

(65) Prior Publication Data

US 2017/0363499 A1 Dec. 21, 2017

(30) Foreign Application Priority Data

Jun. 15, 2016 (DE) .......................... 10 2016 210 682

(51) Int. Cl.
*G01L 19/14* (2006.01)
*G01L 19/06* (2006.01)

(52) U.S. Cl.
CPC ........ *G01L 19/147* (2013.01); *G01L 19/0627* (2013.01)

(58) Field of Classification Search
CPC ..... G01L 19/00; G01L 19/06; G01L 19/0627; G01L 19/14; G01L 19/147
See application file for complete search history.

(56) References Cited

U.S. PATENT DOCUMENTS

2002/0062697 A1* 5/2002 Yamagishi .......... G01L 19/0084
73/715

FOREIGN PATENT DOCUMENTS

| DE | 10 2005 053 062 A | 5/2007 | |
|----|---|---|---|
| DE | 10 2012 222 089 A1 | 6/2014 | |
| JP | 2010032239 A | * 2/2010 | ............. G01L 19/14 |

OTHER PUBLICATIONS

International Organization for Standardization, ISO 1179-1:2007(E) "Connections for general use and fluid power—Ports and stud ends with ISO 228-1 threads with elastomeric or metal-to-metal sealing—Part 1: Threaded ports" 2007 (10 pages).

(Continued)

*Primary Examiner* — Nguyen Q. Ha
(74) *Attorney, Agent, or Firm* — Maginot, Moore & Beck LLP

(57) ABSTRACT

A pressure sensor for determining a pressure of a medium is configured to be screwed into a hydraulic control block, and includes a sleeve-shaped connector stub and sensor element. The stub has a plurality of axial sections, and an axial through bore configured to receive the medium. The axial sections include a threaded section, flange section, carrier section, and tapered portion. The flange section has an annular face facing the threaded section and configured to bear against a surface of the control block. The carrier section includes an inner opening that opens into the bore. The sensor element is positioned on the opening to sealingly close the opening, and is configured to measure the pressure of the medium. The tapered portion defines a reduction in a radial external diameter of the stub between the flange section and the carrier section.

17 Claims, 1 Drawing Sheet

(56) References Cited

OTHER PUBLICATIONS

International Organization for Standardization, ISO 1179-2:2007(E) "Connections for general use and fluid power—Ports and stud ends with ISO 228-1 threads with elastomeric or metal-to-metal sealing—Part 2: Heavy-duty (S series) and light-duty (L series) stud ends with elastomeric sealing (type E)" 2007 (18 pages).
International Organization for Standardization, ISO 1179-3:2007(E) "Connections for general use and fluid power—Ports and stud ends with ISO 228-1 threads with elastomeric or metal-to-metal sealing—Part 3: Light-duty (L series) stud ends with sealing by O-ring with retaining ring (types G and H)" 2007 (20 pages).
International Organization for Standardization, ISO 6149-1:2006(E) "Connections for hydraulic fluid power and general use—Ports and stud ends with ISO 261 metric threads and O-ring sealing—Part 1: Ports with truncated housing for O-ring seal" 2006 (12 pages).
International Organization for Standardization, ISO 6149-2:2006(E) "Connections for hydraulic fluid power and general use—Ports and stud ends with ISO 261 metric threads and O-ring sealing—Part 2: Dimensions, design, test methods and requirements for heavy-duty (S series) stud ends" 2006 (6 pages).
International Organization for Standardization, ISO 6149-3:2006(E) "Connections for hydraulic fluid power and general use—Ports and stud ends with ISO 261 metric threads and O-ring sealing—Part 3: Dimensions, design, test methods and requirements for light-duty (L series) stud ends" 2006 (18 pages).
International Organization for Standardization, ISO 6149-4:2006(E) "Connections for hydraulic fluid power and general use—Ports and stud ends with ISO 261 metric threads and O-ring sealing—Part 4: Dimensions, design, test methods and requirements for external hex and internal hex port plugs" 2006 (18 pages).

\* cited by examiner

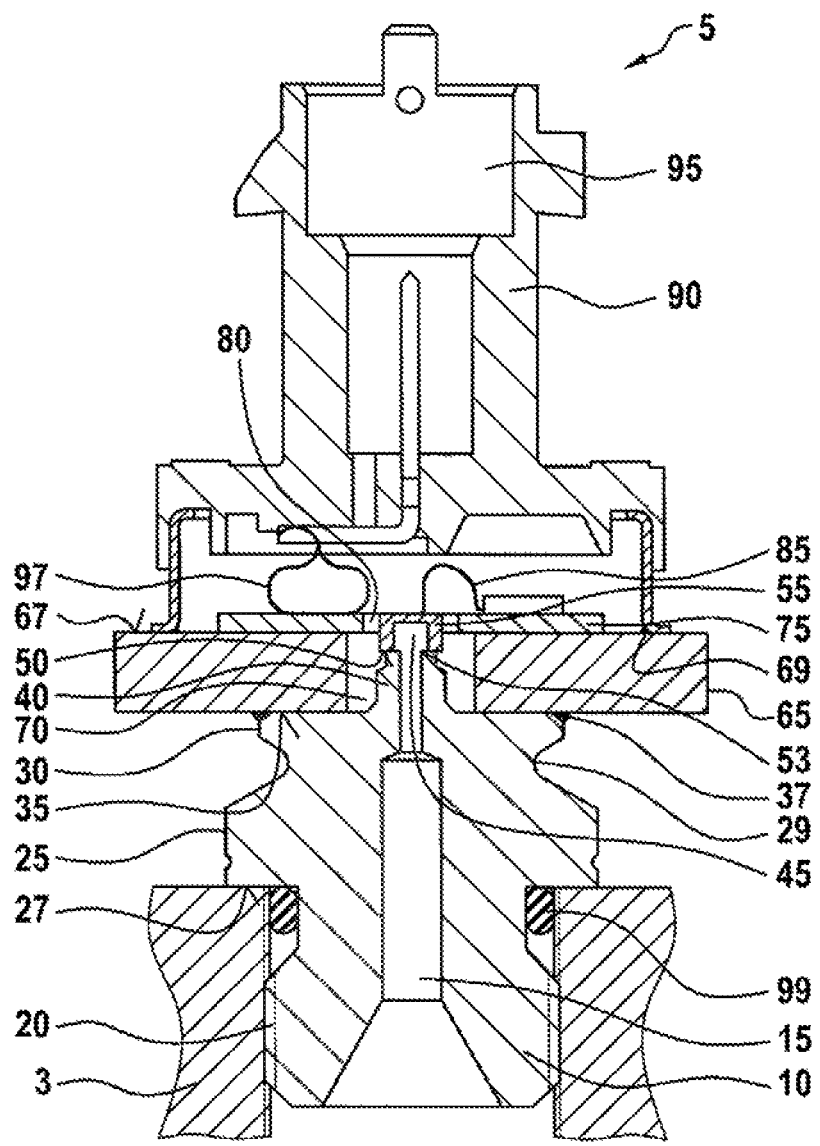

PRESSURE SENSOR

This application claims priority under 35 U.S.C. § 119 to patent application no. DE 10 2016 210 682.1, filed on Jun. 15, 2016 in Germany, the disclosure of which is incorporated herein by reference in its entirety.

The disclosure relates to a pressure sensor for determining the pressure of a medium having a connector stub, suitable for being screwed into a hydraulic control block.

Pressure sensors of this type can be used, for example, in open and closed hydraulic circuits.

BACKGROUND

A pressure sensor of the generic type is known, for example, from DE 10 2012 222 089 A1. Said document describes a pressure sensor which comprises a sensor chip, a housing with a connector stub, and a plug part for electric attachment of the sensor chip.

DE 10 2005 053 062 A1 also discloses a pressure sensor for screwing into a connector opening. Here, a pressure measurement cell which comprises a flexible diaphragm as measuring element is welded directly onto a connector stub and is configured in such a way that it forms a part of the housing.

In the case of connectors which are customary in hydraulics for fastening a pressure sensor, the thread of the connector stub of the pressure sensor is screwed into a control block, a flange section of the connector stub resting on the control block.

The standardized customary connectors in hydraulics in accordance with DIN EN ISO 1179 and DIN EN ISO 6149 cause potentially great mechanical loads at the connecting point. A high mechanical stress which brings about a deformation of the connector stub, in particular in the case of mobile hydraulic applications, in which very high screw-in torques are required, is produced when the connector stub is screwed into the control block. Said deformation of the connector stub acts on a sensor chip or a measurement cell and already mechanically deforms it without pressure loading by way of the medium. This can bring about a zero point shift of the sensor signal, which zero point shift has to be compensated for by way of a calibration of the zero point of the sensor.

SUMMARY

The subject matter of the present disclosure is an improved pressure sensor and a production method for an improved pressure sensor.

A pressure sensor for determining the pressure of a medium is proposed, suitable for being screwed into a hydraulic control block, having a sleeve-shaped connector stub which has an axial through bore for receiving the medium, having a sensor element which is arranged on an inner opening of the through bore for measuring the pressure of the medium, and which sensor element closes the opening sealingly.

The connector stub is divided axially into a threaded section, a flange section and a carrier section, of which the flange section has an annular face which faces the threaded section for bearing against a surface of a control block, and said opening of the axial through bore being formed in the carrier section.

A radial external diameter of the connector stub is reduced in the manner of a tapered portion between the flange section and the carrier section.

In the case of a pressure sensor of this type with the described tapered portion, the transmission of the mechanical stress to the carrier section during the screwing of the connector stub into the control block is interrupted by way of the tapered portion, with the result that the carrier section remains practically free from deformation. The sensor element which is arranged thereon also experiences no deformation or only a negligible mechanical deformation in the screwed-in state of the pressure sensor, and therefore likewise no shift or only a negligible shift of the zero point of the sensor signal of the sensor element. Therefore, the calibration of the electric zero point of the sensor element is no longer required at least after screwing into the control block.

Further advantageous embodiments are the subject matter of the description, claims, and the FIGURE.

The connector stub with the threaded section, the flange section, the tapered portion and the carrier section is advantageously produced in one piece.

Said tapered portion between the flange section and the carrier section of the connector stub which is produced in one piece is advantageously formed by way of turning of an annular groove which can be of notch-shaped or rectangular configuration in profile and, in particular, can have a rounded groove bottom. Here, the rounded nature of the groove bottom prevents material cracks.

The carrier section of the connector stub can be formed in the shape of a pedestal. The axial through bore of the connector stub ends in the pedestal, and the sensor element is fastened on an annular face of the pedestal. The pedestal ensures further mechanical decoupling between the flange section and the sensor element. Moreover, the contact face between the pedestal and the sensor element is more readily accessible, with the result that, for example, a welded seam between the pedestal and the sensor element can be produced more easily.

The sensor element can preferably be connected to the annular face of the pedestal by way of welding. At the same time, the hermetic sealing of the pressure medium against the interior of a covering cap of the pressure sensor takes place by way of the sensor element which is welded on.

An element, in particular a hexagon, for attaching a screwing tool can be fastened, in particular welded, on an annular face of the carrier section. By way of a screwing tool being attached, the threaded section of the connector stub is screwed into the control block with a specified torque. Moreover, said element stabilizes the carrier section additionally against deformation.

Said element, in particular a hexagon, advantageously has an axial through bore, in which at least the sensor element and the pedestal are received partially. This makes a compact and space-saving overall design of the pressure sensor possible.

A printed circuit board can be fastened on said element, in particular the hexagon, and can have a central through bore, through which the sensor element is accessible. An electric connection between the printed circuit board and the sensor element can then take place, for example, simply by way of a bonded connection.

A covering cap, in particular with a connector socket which is integrated therein, can be fastened, in particular welded, on said element, in particular the hexagon. Said covering cap comprises a connector socket and at the same time serves to protect the printed circuit board against external contamination and moisture, for example in accordance with the protection classes IP67 and IP67K.

The electric connection between the printed circuit board and the connector socket which is integrated in the covering cap can take place by way of spring contacts which are fastened, in particular soldered, on the printed circuit board, are advantageously closed during placing of the covering cap onto said element, in particular the hexagon, and produce an electric connection as a result between the printed circuit board and the integrated connector socket.

It can be advantageous during the production of the sensor to first of all weld the sensor element to the carrier section or the pedestal before the fastening of the element, in particular a hexagon, for attaching a screwing tool on the carrier section. The contact face between the carrier section or pedestal and the sensor element is thus readily accessible from the side. In a further step, said element for attaching a screwing tool can then be welded onto the carrier section.

BRIEF DESCRIPTION OF THE DRAWINGS

In the following text, one exemplary embodiment of the disclosure will be described in greater detail using the FIGURE.

The FIGURE shows a sectional view of one embodiment of the pressure sensor according to the disclosure with a tapered section.

DETAILED DESCRIPTION

In accordance with the FIGURE, a pressure sensor 5 according to one exemplary embodiment of the present disclosure consists of a sleeve-shaped connector stub 10 which has an axial through bore 15 for receiving a medium, for example a hydraulic fluid or hydraulic oil, and is produced from one piece.

The connector stub 10 is divided into a threaded section 20, a flange section 25 and a carrier section 30.

A pedestal 40 rises up from the surface of the carrier section 30, in which pedestal 40 the axial through bore 15 of the connector stub 10 opens at an opening 45.

With the configuration of a welded seam 53, a sensor element 55 is welded onto an annular face 50 of the pedestal 40 in such a way that it sealingly closes an inner opening 45 of the through bore 15. The flange section 25 of the connector stub 10 has an annular face 27 which faces the threaded section 20 for bearing against a surface of a control block 3.

The radial external diameter of the connector stub 10 is reduced in the manner of a tapered portion 29 between the flange section 25 and the carrier section 30.

The tapered portion 29 is formed by way of an annular groove which is of notch-shaped configuration in profile and has a rounded groove bottom. As an alternative, the annular groove can have a rectangular or trapezoidal profile.

A hexagon 65 which serves as a carrier for a printed circuit board 75 and for attaching a screwing tool is welded on the annular face 35 of the carrier section 30 by way of a welded seam 37. Instead of the basic shape of a hexagon, said element can have any other basic shape which at least has wrench faces for attaching a corresponding screwing tool.

Both the hexagon 65 and the printed circuit board 75 have axial through bores 70, 80, into which the pedestal 40 and the sensor element 55 are received. The sensor element 55 which is accessible as a result is connected electrically to the printed circuit board 75 by way of a bonded connection 85.

A covering cap 90 having a connector socket 95 which is integrated therein is welded on the annular face 67 of the hexagon 65 by way of a welded seam 69. As an alternative, the covering cap 90 can also be adhesively bonded or screwed or fastened by way of a flanged connection to the annular face 67 of the hexagon 65.

The electric connection between the printed circuit board 75 and the connector socket 95 which is integrated in the covering cap 90 takes place by way of spring contacts 97 which are fastened, in particular soldered, on the printed circuit board 75. As an alternative, the electric connection between the printed circuit board 75 and the connector socket 95 can take place by way of a cable connection with plug-in sockets.

A profile sealing ring 99 is placed onto the annular face 27 of the flange section 25 of the connector stub 10 for sealing against the pressure medium. As an alternative, in particular in the case of use at high pressures, a groove can be machined into the annular face 27 of the flange section (25), into which annular face 27 the profile sealing ring 99 is pressed. The threaded section 20 of the connector stub 10 is screwed into the control block 3 with a specified torque.

During the screwing of the threaded section 20 of the connector stub 10 into the control block 3, the flange section 25 rests at least with an outer collar, on the annular face 27, on the surface of the control block 3 and is braced with the control block 3 by way of the screw-in torque. The resulting stressing or bending of the flange section 25 is decoupled by way of the tapered portion 29 between the flange section 25 and the carrier section 30, with the result that the carrier section 30 remains practically free from deformation. In principle, the flange section 25 can be considered to be a spring element which is fastened only radially on the inside and is deformed by way of stressing predominantly on its radially outer edge (the collar or the annular face 27), in order to absorb the forces which are produced by way of the screw-in torque. Forces or stresses are introduced into the connector stub 10 close to the axis by way of the flange section 25 and therefore bring about only a small deformation of the adjoining regions, such as the carrier section 30.

The sensor element 55 which is arranged on the carrier section 30 experiences no mechanical deformation or only negligible mechanical deformation even in the screwed-in state of the pressure sensor 5. The screw-in torque is no longer limited by the feedback on the sensor element 55. Therefore, the required high screw-in torques of, for example, up to 45 Nm can be realized. Moreover, the high screw-in torques ensure a high shock and vibration resistance of the screwed connection.

The complexity in terms of production technology is low and thus permits inexpensive production. The tapered portion 29 can be produced inexpensively by way of turning of an annular groove between the flange section 25 and the carrier section 30 on the single-piece connector stub 10, with the result that a radial external diameter of the connector stub 10 is reduced there.

The sensor element 55 is subsequently fastened on the annular face 50 of the pedestal 40 of the carrier section 30 by way of a welding method 53, in particular laser welding or capacitor discharge welding, and seals the interior of the pressure sensor 5 hermetically against the pressure medium.

The element for attaching the screwing tool, in particular a hexagon 65, is subsequently fastened on the annular face 35 of the carrier section 30 by way of a welding method 37, in particular laser welding or capacitor discharge welding.

A printed circuit board 75 which carries an evaluation electronics module is fastened on the annular face of the element for attaching the screwing tool, for example by way of an adhesive bonding method.

Both the hexagon 65 and the printed circuit board 75 have axial through bores 70, 80, into which the pedestal 40 and the sensor element 55 are received. The sensor element 55 which is accessible as a result is connected electrically to the printed circuit board 75 by way of a bonded connection 85.

A covering cap 90 with a connector socket 95 which is integrated therein is subsequently welded, adhesively bonded or screwed onto the annular face 67 of the hexagon 65, and at the same time serves to protect the printed circuit board against external contamination in accordance with the protection classes IP67 and IP67K.

LIST OF REFERENCE NUMERALS

3 Control block
5 Pressure sensor
10 Connector stub
15 Through bore
20 Threaded section
25 Flange section
27 Annular face
29 Tapered portion
30 Carrier section
35 Annular face
37 Welded seam
40 Pedestal
45 Opening
50 Annular face
53 Welded seam
55 Sensor element
65 Hexagon
67 Annular face
69 Welded seam
70 Through bore
75 Printed circuit board
80 Through bore
85 Bonded connection
90 Covering cap
95 Connector socket
97 Spring contact
99 Profile sealing ring

What is claimed is:

1. A pressure sensor for determining a pressure of a medium, the pressure sensor configured to be screwed into a hydraulic control block, and comprising:
   a sleeve shaped connector stub that includes:
      an axial through bore configured to receive the medium; and
      a plurality of axial sections including:
         a threaded section;
         a flange section having an annular face facing toward the threaded section and configured to bear directly against a surface of the control block;
         a carrier section having an inner opening that opens into the through bore; and
         a tapered portion that defines a reduction in a radial external diameter of the connector stub between the flange section and the carrier section;
   a sensor element positioned on the inner opening so as to sealingly close the inner opening; and
   a pedestal extending up from the carrier section of the connector stub and having an annular face, wherein:
   the carrier section and the pedestal are made of one piece, and
   the sensor element is connected to the pedestal via a welding connection.

2. The pressure sensor of claim 1, wherein the tapered portion of the connector stub is an annular groove having one of a rectangular shaped profile and a notch shaped profile.

3. The pressure sensor of claim 2, wherein the annular groove has a rounded groove bottom.

4. The pressure sensor of claim 1, wherein the threaded section, flange section, tapered portion and carrier section of the connector stub are in one piece.

5. The pressure sensor of claim 1,
   wherein:
      the through bore opens in the pedestal; and
      the sensor element is fastened onto the annular face of the pedestal.

6. The pressure sensor of claim 5, wherein:
   the annular face of the pedestal rises up from the carrier section of the connector stub.

7. The pressure sensor of claim 1, further comprising:
   an attachment element configured to attach a screwing tool and fastened on an annular face of the carrier section of the connector stub.

8. The pressure sensor of claim 7, wherein:
   the attachment element has a further axial through bore; and
   the sensor element is at least partially received in the further axial through bore.

9. The pressure sensor of claim 7,
   wherein:
      the through bore opens in the pedestal;
      the sensor element is fastened onto the annular face of the pedestal;
      the attachment element has a further axial through bore; and
      at least the pedestal is received in the further axial through bore.

10. The pressure sensor of claim 7, further comprising:
    a printed circuit board fastened on the attachment element and including a central through opening that provides access to the sensor element; and
    an electric connection between the printed circuit board and the sensor element.

11. The pressure sensor of claim 7, wherein the attachment element has a hexagon shape.

12. The pressure sensor of claim 7, wherein the attachment element is fastened on the annular face of the carrier section via a welding connection.

13. The pressure sensor of claim 7, further comprising:
    a covering cap fastened on the attachment element.

14. The pressure sensor of claim 13, wherein:
    the covering cap has an integrated connector socket; and
    the printed circuit board further includes spring contacts that are electrically connected to the connector socket.

15. A method of producing a pressure sensor for determining a pressure of a medium and configured to be screwed into a hydraulic control block, the method comprising:
    fastening a sensor element that is configured to measure a pressure of a medium on an opening of a through bore in a sleeve-shaped connector stub to sealingly close the opening, wherein:
       the connector stub has a plurality of axial sections including:
          a threaded section;
          a flange section having an annular face facing toward the threaded section and configured to bear against a surface of the control block;
          a carrier section; and a tapered portion that defines a reduction in a radial external diameter of the connector stub between the flange section and the carrier section; and the opening is located in the carrier section; and fastening an attachment element configured to attach a screwing tool on the carrier section via welding;

wherein the fastening of the sensor element includes welding.

16. The method of claim 15, wherein welding at least one of the sensor element and the attachment element includes at least one of laser welding and capacitor discharge welding.

17. A pressure sensor for determining a pressure of a medium, the pressure sensor configured to be screwed into a hydraulic control block, and comprising:

a sleeve shaped connector stub that includes:
an axial through bore configured to receive the medium; and
a plurality of axial sections including:
a threaded section;
a flange section having an annular face facing toward the threaded section and configured to bear against a surface of the control block;
a carrier section having an inner opening that opens into the through bore; and
a tapered portion that defines a reduction in a radial external diameter of the connector stub between the flange section and the carrier section;

a sensor element positioned on the inner opening so as to sealingly close the inner opening;

an attachment element configured to attach a screwing tool and fastened on an annular face of the carrier section of the connector stub; and a pedestal extending up from the carrier section of the connector stub and having an annular face, wherein:

the through bore opens in the pedestal, the sensor element is fastened onto the annular face of the pedestal, the sensor element is connected to the annular face of the pedestal via a welding connection, and the annular face of the pedestal rises up from the carrier section of the connector stub.

\* \* \* \* \*